United States Patent
Ewert et al.

(10) Patent No.: US 8,738,799 B2
(45) Date of Patent: May 27, 2014

(54) FRAMING FORMAT SELECTION IN A COMMUNICATIONS NETWORK WITH A USER PLANE

(75) Inventors: Joerg Christian Ewert, Erkelenz (DE); Martin Stümpert, Hochspeyer (DE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1490 days.

(21) Appl. No.: 11/815,707

(22) PCT Filed: Feb. 7, 2005

(86) PCT No.: PCT/EP2005/001216
§ 371 (c)(1),
(2), (4) Date: May 19, 2008

(87) PCT Pub. No.: WO2006/094515
PCT Pub. Date: Sep. 14, 2006

(65) Prior Publication Data
US 2009/0070484 A1    Mar. 12, 2009

(51) Int. Cl.
G06F 15/16    (2006.01)

(52) U.S. Cl.
USPC .................................................. 709/236

(58) Field of Classification Search
CPC ............ H04L 29/06027; H04L 65/103; H04L 65/104; H04L 65/1043; H04L 65/1069
USPC .............. 709/228, 249, 230–237; 455/436; 370/254, 457
See application file for complete search history.

(56) References Cited

U.S. PATENT DOCUMENTS

| 7,620,041 | B2* | 11/2009 | Dunn et al. | 370/389 |
| 2002/0172220 | A1* | 11/2002 | Baker et al. | 370/465 |
| 2002/0176442 | A1* | 11/2002 | Favichia et al. | 370/465 |
| 2004/0068571 | A1* | 4/2004 | Ahmavaara | 709/228 |
| 2004/0100914 | A1* | 5/2004 | Hellwig et al. | 370/254 |
| 2004/0258045 | A1* | 12/2004 | Groves et al. | 370/352 |

FOREIGN PATENT DOCUMENTS

WO    WO 02096047 A1 * 11/2002

* cited by examiner

*Primary Examiner* — Thai Nguyen

(57) ABSTRACT

The invention relates to a technique for selecting a framing format to be used for communications on the user plane of a layered communications network. The selection technique includes the provision of a first user plane component (such as a media gateway, MGW) bridging transmission regimes and operable in accordance with two or more different framing formats. The first user plane component is controllable via control messages received from a control plane without being responsive to any framing format instructions possibly included in the control messages. The first user plane component or any other user plane equipment in communication with the first user plane component selects the framing format to be used for user plane communications. The selected framing format is then implemented by the first user plane component for communications with a second user plane component.

16 Claims, 6 Drawing Sheets

| Protocol Version | Framing Format |
| --- | --- |
| CS1 | I.trunk framing |
| CS2 | Nb framing |

FRAMING FORMAT SELECTION IN A COMMUNICATIONS NETWORK WITH A USER PLANE

FIELD OF THE INVENTION

The invention relates to the field of communications networks with a control plane and a user plane. More specifically, the invention relates to a technique for selecting a framing format to be used for communications on the user plane.

BACKGROUND OF THE INVENTION

In the past, different communications networks like public land mobile networks (PLMN), public switched telephone networks (PSTN) and data/IP networks (e.g. the public Internet) have co-existed in the form of separate monolithic networks vertically aligned with respect to each other. In each of these monolithic networks, network control and connectivity (i.e., the transfer of user data) have traditionally been bundled.

Today, mobile communications is migrating towards $3^{rd}$ generation networks like the universal mobile telecommunication system (UMTS) as specified by the $3^{rd}$ generation partnership project (3GPP). In parallel with the migration towards $3^{rd}$ generation mobile networks, a layered network architecture that is based on horizontal planes replaces the traditional vertical network architectures. According to the horizontal approach, the tasks of network control and connectivity are being split into different horizontal planes, namely a network or call control plane on the one hand and a user plane (or connectivity plane) on the other hand. In layered communications networks, the user plane is based primarily on cell- and packet-based data transfer technologies like the asynchronous transfer mode (ATM) and the Internet protocol (IP).

In connection with the transition towards horizontally oriented network architectures, conventional components of time-division multiplexing (TDM) networks, wideband code division multiple access (WCDMA) networks, and other network components have to be adapted. In the case of TDM networks for example, mobile services switching centres (MSCs), which traditionally include network control tasks and connectivity tasks in the same node, are separated into a user plane component such as media gateway (MGW) on the one hand and a control plane component such as a dedicated server component (MSC server) on the other hand. In conventional general packet radio service (GPRS) networks a similar migration takes place. The conventional serving GPRS support node (SGSN) is split into a MGW and a dedicated server component (SGSN server).

An important task on the user plane is to provide interfaces to present-day telecommunications networks—which are typically based on TDM or (W)CDMA—and to legacy networks, such as PSTN. Accordingly, network components are required on the user plane that bridge different transmission regimes (and, if possible, add additional services like bandwidth on demand to end-user connections). As described in Magnus Fyrö et al, "Media gateway for mobile networks", Ericsson Review no. 4, 2000, 216 to 223, MGWs are one possible realization of such bridging components. Whereas on the network control plane the MSC server controls circuit-switched (CS) services and the SGSN server controls packet-switched (PS) services, a bridging MGW on the user plane may be common to both CS and PS networks.

An the exemplary layered network architecture is shown in FIG. 1. The upper half of FIG. 1 corresponds to the network control plane including components like the MSC server or the SGSN server, whereas the lower half corresponds to the user plane including components like MGWs. In FIG. 1, fine lines represent control connections captioned with the respective control protocol, and thicker lines represent data transfer connections.

If in a scenario as depicted in FIG. 1 a call is to be set up to a mobile terminal, different network components may be involved. Usually, the network components involved are determined by the network type from which the call originates and the network type in which the call terminates. If the call originates and terminates within a particular PLMN, none of the components depicted in FIG. 1 will be involved except for the PLNM. The situation is different if the call originates from a UMTS user equipment (UE). Although the basic principles of setting up a call are similar to those conventionally employed in $2^{nd}$ generation PLMN networks such as the global system for mobile communication (GSM), additional network nodes like MGWS, GGSNs, etc. will get involved.

In the exemplary scenario of FIG. 1, a call between a UMTS terrestrial radio access network (UTRAN) or a base station subsystem (BSS) and a PSTN is interconnected by two different MGWs. MGW1 for example interfaces the UTRAN and BSS, and switches ATM or routes IP traffic. The MSC server and the SGSN server both have a control connection to UTRAN and BSS. MGW2 interfaces the PSTN and is controlled using the H.248 control protocol by the MSC server and a gateway MSC (GMSC)/transit switching center (TSC) server.

FIGS. 2 to 4 schematically show the messaging involved when setting up a call from an originating UE (UE1) to a terminating UE (UE2) in a layered communications network of the type shown in FIG. 1 with a bearer independent core network (CN) as introduced by 3GPP Release 4. The bearer independent CN enables cell- and packet-based networks as the bearer, in addition to TDM bearers supported in conventional wireless networks. In general, a bearer is a transmission link with predefined characteristics (such as capacity, delay, bit error rate, etc.).

The messaging shown in FIGS. 2 to 4 reflects knowledge internal to the applicant. Any reference to the content of FIGS. 2 to 4 must therefore not be construed to acknowledge that the messaging constitutes prior art.

The call set up scenario of FIGS. 2 to 4 includes normal paging and forward bearer establishment over an ATM CN. For forward bearer establishment, bearer establishment and MGW selection are deferred. As is well known, deferred MGW selection minimizes the number of MGWs used in the call and the bandwidth used in the ATM backbone. In general, MGW selection is done using the so-called bearer-independent control (BICC) mechanism that involves signalling on the control plane.

In the following, only those messages shown in FIGS. 2 to 4 will be explained in greater detail that are required for an understanding of the framing control mechanism. Framing is a method of packing continuous user plane data into individual cells or packets. In general, an MGW supports several standardized framing formats. The Nb framing format for example has been standardized by 3GPP (see Technical Specification 3G TS 29.415). A further framing format is I.trunk, which has been standardized by the international telecommunications union (ITU). Other framing formats were standardized by the Internet engineering task force (IETF).

Referring to FIG. 2, call set up starts with UE1 contacting its associated MSC Server (MSC1) via message #1. MSC1 acknowledges the call establishment request with message #2. MSC1 then sends a call control message #3 on the control plane to the MSC Server (MSC2) associated with UE2 (as deferred MGW selection is used). Message #3 is an initial address message (IAM) that contains a placeholder "AAL2/framing". This placeholder, however, is a dummy parameter that will not be considered further by MSC2.

With message #8, MSC2 orders Nb framing from the selected MGW associated with UE2 (i.e., from MGW2) using the parameter "3gup:interface=CN". Likewise, with message #20, MSC1 orders Nb framing from the MGW associated with UE1 (i.e., from MGW1). Then, with message #24, Nb framing is selected and initialised for communications between MGW1 and MGW2 in ATM CN.

Nb framing is the framing format typically utilized on the user plane in connection with call control features such as forward bearer establishment/deferred MGW selection, whereas I.trunk is often the default framing format on the user plane. Due to this constellation, an implementation of forward bearer establishment/deferred MGW selection on the control plane requires the transmission of framing format instructions to the user plane. In the messaging scenario shown in FIGS. 2 to 4, this requirement is met by ordering from both MGWs the implementation of Nb framing (with messages #8 and #20 generated on the control plane).

It has been found that certain network control features such as the deferred MGW selection (including its framing-related aspects) shown in FIGS. 2 to 4 are difficult to implement under specific network conditions such as in inhomogeneous networks. Layered networks of the types shown in FIG. 1 and in the upper part of FIG. 2 may be inhomogeneous for various reasons. Network operators might for example prefer to first invest in new MSC Servers before replacing the MGWs. As a result, the new MSC servers might operate according to a new standard version, whereas the MGWs will still operate in accordance with an older version. Also, the network operator servicing UE1 in FIG. 2 might operate a newer combination of MSC Server/MGW than the network operator servicing UE2.

Accordingly, there is a need for a technique that prepares the ground for sophisticated network control features in layered communications networks. In particular, there is a need for an efficient framing selection approach that facilitates the implementation of sophisticated network control features in inhomogeneous and other networks.

SUMMARY OF THE INVENTION

According to a first aspect of the invention, this need is satisfied by a method of selecting on a user plane a framing format for user plane communications between two user plane components each bridging transmission regimes, comprising providing a first user plane component bridging transmission regimes and operable in accordance with two or more different framing formats, the first user plane component being controllable via control messages received from a control plane without being responsive to any framing format instructions possibly included therein, selecting, by the first user plane component or any other user plane equipment in communication with the first user plane component, a framing format to be used for user plane communications, and implementing the selected framing format by the first user plane component for communications with a second user plane component.

Accordingly, the selection of a framing format need no longer be administered on the control plane, but may be delegated to the user plane. This permits a decoupling of call control procedures on the one hand and framing control mechanisms on the other hand. As one result of this decoupling, the implementation of sophisticated network control features is facilitated.

On the control plane, at least one control plane component may be provided for generating the control messages that control the first user plane component. According to a first variant of the invention, the control plane component generates the control messages free from any framing format instructions. According to a second variant, the control plane component is configured to generate control messages that could include framing format instructions. The user plane component then simply ignores any framing format instructions received via such control messages. The second variant does not necessarily require any modifications on the control plane and can be implemented using control plane components and control plane protocols essentially as shown in FIGS. 2 to 4.

Various mechanisms for selecting on the user plane the framing format to be used for user plane communications may be used. According to one approach, the implemented framing format results from a negotiation on the user plane between the first and the second user plane component. In the course of the negotiation process, the first user plane component may receive from the second user plane component a message specifying at least one framing format preferred, supported or ordered by the second user plane component. Alternatively, or in addition, the first user plane component may send to the second user plane component a message specifying at least one framing format preferred, supported or selected by the first user plane component. The first user plane component may, for example, send a message specifying the framing format selected by the first user plane component in response to a message received from the second user plane component that specifies one or more framing formats preferred (or supported) by the second user plane component.

A second approach for selecting the framing format to be used for user plane communications includes selecting the framing format dependent on control information included in one or more of the received control messages but not related to framing format selection. Accordingly, the first (and/or second) user plane component may use the receipt of a particular control message or control information as an event triggering the implementation of a particular framing format, although the content of the control message or control information does not relate to framing format signalling. As an example, the control protocol version signalled for example via separate control messages to both the first and/or the second user plane component may be utilized as such a triggering event.

Preferably, the triggering event is derived on the user plane from control information received by both the first and the second user plane component. This synchronization mechanism ensures that the individual user plane components can be configured to each select the same framing format without having to communicate with each other.

According to a third framing format selection approach that may be combined with the second approach outlined above, the framing format is selected dependent on a bearer control context. In one embodiment, the selected framing format is dependent on a bearer control protocol version. For the purpose of selecting the framing format, the bearer control protocol version to be utilized is determined on the user plane first. In a next step, a framing format that has previously been associated with the particular bearer control protocol version is determined on the user plane. The framing format thus determined may then be selected for user plane communications. This mechanism is based on pre-established associations between individual framing formats and individual bearer control protocol versions. The associations may be established in the form of a look-up table or in any other way.

The bearer control protocol version to be utilized may be specified as control information in control messages received by one or more user plane components from the control plane. However, other mechanisms for instructing the user plane components to utilize a particular bearer control protocol version may alternatively be implemented.

From the above it has become apparent that the framing format selection may be performed in context with bearer establishment on the user plane. More specifically, the framing format selection may be part of a forward bearer establishment scenario or a scenario with a deferred selection of any one of the first and second user plane component.

According to one variant of the invention, the framing format to be used for user plane communications is selected by the first user plane component. According to a second variant, the selection step is performed by equipment on the user plane in communication with the first user plane component. This equipment may be co-located with the first user plane component (i.e., in the form of a separate module attached to the first user plane component) or it may be remote therefrom (e.g., it may be included in the second user plane component).

According to a further aspect of the invention, a computer program product is provided. The computer program product comprises program code portions for performing the steps of the present invention when the computer program product is run on one or more computing devices. The computer program product may be stored on a computer-readable recording medium.

A still further aspect of the invention relates to a user plane component for selecting on a user plane a framing format for user plane communications. The user plane component comprises a first interface that interfaces two or more transmission regimes, a second interface for receiving control messages from the control plane, a controller for selecting a framing format to be used for user plane communications without being responsive to any framing format instructions possibly included in the control messages, and a framing unit operable in accordance with two or more different framing formats, the framing unit implementing the selected framing format for communications with a second user plane component via the first interface.

The user plane component may be configured as a media gateway or any other network node with similar bridging tasks. The bridged transmission regimes may include CDMA-based, WCDMA-based, TDM-based, ATM-based, and IP-based networks.

BRIEF DESCRIPTION OF THE DRAWINGS

Further aspects and advantages of the invention will become apparent from the following description of preferred embodiments of the invention and from the drawings, in which.

DESCRIPTION OF PREFERRED EMBODIMENTS

In the following description, for purposes for explanation and not limitation, specific details are set forth, such as particular communication protocols, network components, etc. in order to provide a thorough understanding of the present invention. It will be apparent to one skilled in the art that the present invention may be practised in other embodiments that depart from these specific details. Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described as a method, it may also be embodied in a computer program product as well as a system comprising a computer processor and a memory coupled to the processor, wherein the memory is encoded with one or more programs that may perform the methods disclosed herein.

Figure 5:
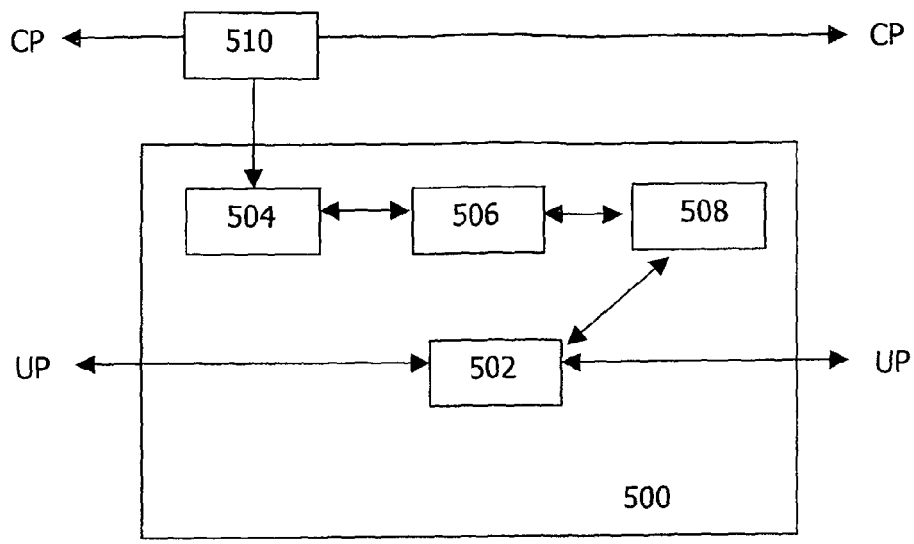
FIG. 5 shows an apparatus embodiment of the present invention.

FIG. 5 shows an exemplary user plane component 500 belonging to a layered communications network with a control plane CP and a user plane UP. The user plane component 500 may be located at the edge of an ATM-based or IP-based core network and may interface one or more further networks (e.g., a TDM-based and/or a WCDMA-based PLMN).

In the exemplary configuration shown in FIG. 5, the user plane component 500 includes a first interface 502, a second interface 504, a controller 506 and a framing unit 508. The first interface 502 bridges and interfaces a first transmission regime in the core network and a second transmission regime in one or more neighbouring networks. The second interface 504 is adapted to receive control messages from the control plane CP. The control messages are generated by a control plane component 510.

The controller 506 communicates with the second interface 504 and selects the framing format to be used for user plane communications without being responsive to any framing format instructions possibly included in the control messages received via the second interface 504. The framing unit 508 communicates with both the controller 506 and the first interface 502. The framing unit 508 is operable in accordance with two or more different framing formats and implements the framing format selected by the controller 506 for communications via the first interface 502 with a second user plane component (not shown). The second user plane component may be located at an opposite edge of the core network.

As shown in FIG. 5, the user plane component 500 and the control plane component 510 may be physically separated components. Alternatively, the layered communications network may be configured to include a user plane component and a control plane component that are combined in single physical node but arranged on logically separated user and control planes, respectively.

Figure 6:
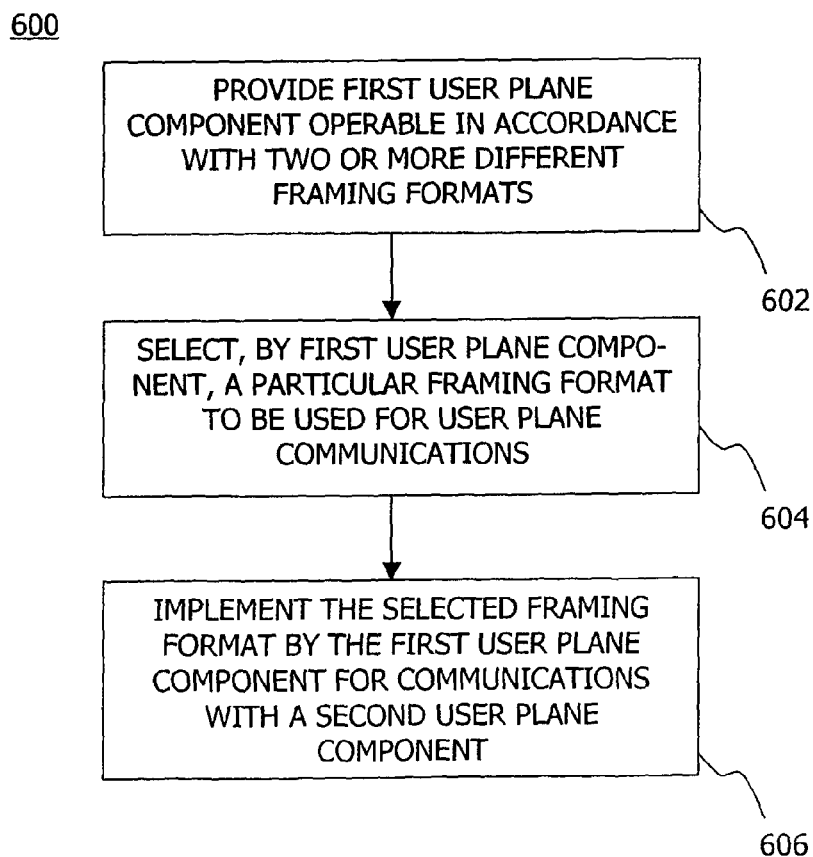
FIG. 6 shows a method embodiment of the present invention.

FIG. 6 schematically shows a flow chart 600 of a method for selecting a framing format for user plane communications in a layered communications network. The method embodiment shown in FIG. 6 may be implemented by the user plane component 500 shown in FIG. 5 or a similar component.

In a first step 602, a first user plane component bridging transmission regimes is provided. The first user plane component is operable in accordance with two or more different framing formats and controllable via control messages received from a control plane. In a first variant of step 602, the control messages received by the first user plane component from the control plane do not include any framing format instructions. According to a second variant, the control messages may include framing format instructions (e.g., to ensure that a control plane component generating the control messages remains compatible with a particular standard or standard version). The first user plane component is configured to ignore any framing format instructions possibly included in the control messages received from the control plane.

In a second step 604, the first user plane component or any other user plane equipment in communication with the first user plane component selects a framing format to be used for user plane communications. The selection step 604 is performed such that call control procedures involving the control plane on the one hand and framing control on the user plane on the other hand are clearly separated from each other. This allows to keep the control plane free from any information about the particular framing technology used on the user plane.

In a final step 606, the selecting framing format is implemented by the first user plane component for communications with a second user plane component.

In the following, two different framing format selection mechanisms will be exemplarily described in more detail in context with forward bearer establishment and deferred MGW selection. The exemplary mechanisms will be illustrated in connection with the layered network architectures shown in FIG. 1 and the upper part of FIG. 2, and the messaging scenario explained above with reference to FIGS. 2 to 4. It should be noted, however, that the particular framing format selection mechanisms described hereinafter may also be used in context with different call scenarios, different network configurations, and different messaging scenarios.

Figure 1:
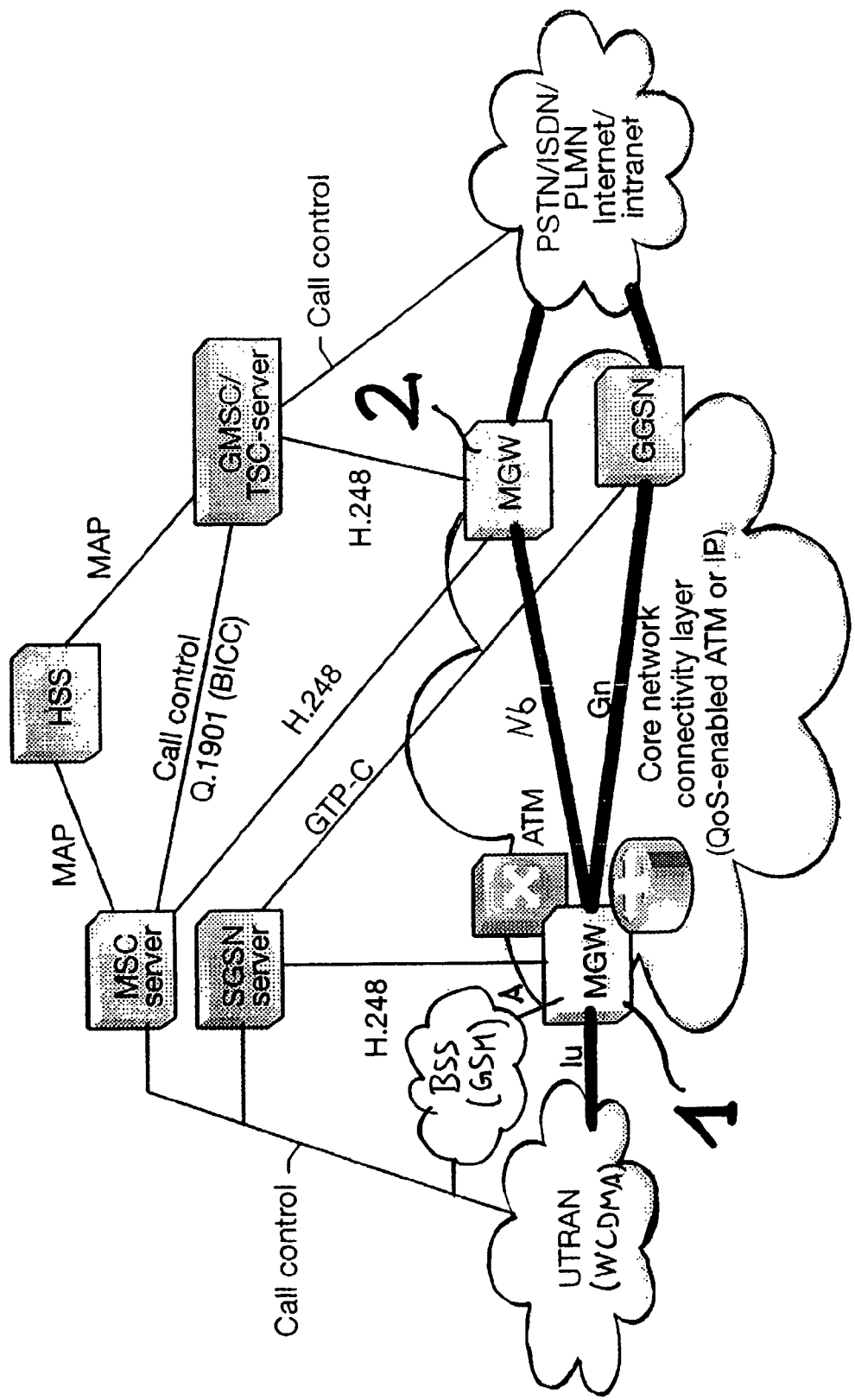
FIG. 1 shows a layered communications network in which the invention can be practised.
Figure 2:
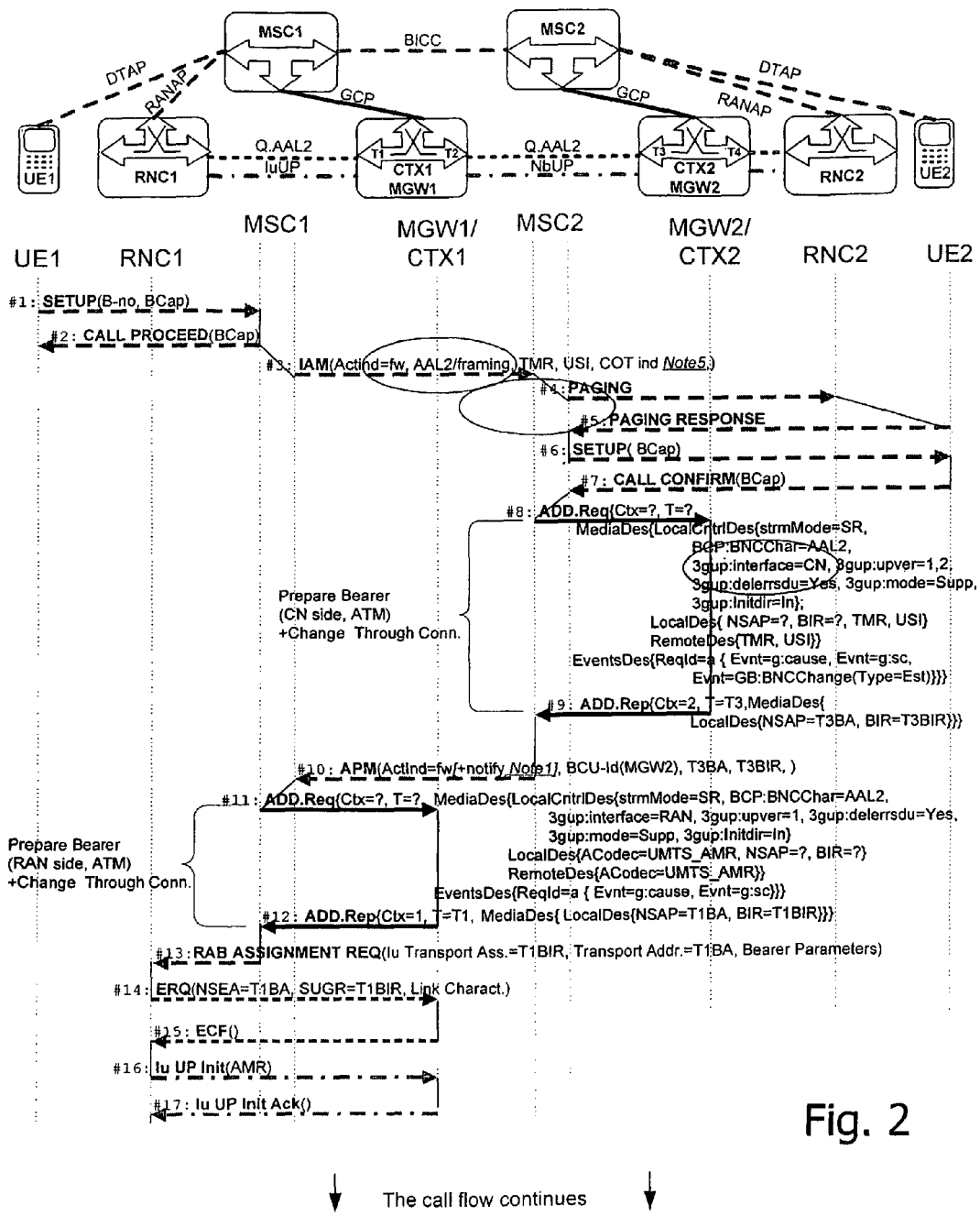
FIGS. 2 to 4 show an internal and exemplary messaging scenario for bearer establishment on which the invention can be based.

As shown in FIG. 1 and in the upper part of FIG. 2, Iu UP framing is used between the radio network controllers (RNCs) in the UTRAN and the MGWs. Nb UP framing is used between MGWs in an IP-based CN. In the IP-based CN, bearer establishment is performed in accordance with the IP bearer control protocol (IPBCP).

For an ATM-based CN, (at least) two possible framing formats exist. The first possible framing format is Nb framing as specified by 3GPP, and the second possible framing format is I.trunk as standardized by ITU. I.trunk specifies packet format and procedures to encode different information streams for bandwidth efficient transport by ATM adaptation layer type 2 (AAL2). In the ATM-based CN, bearer establishment is governed by the Q.AA2 signalling protocol.

According to a first exemplary and UP-based framing format selection mechanism for an ATM-based CN, the framing format (here either Nb framing or I.trunk framing) is selected dependent on the result of a negotiation process in the Q.AAL2/Q.AAL2.ACK procedure. For an IP-based ATM and IPBCP, a similar approach may be chosen.

Figure 3:
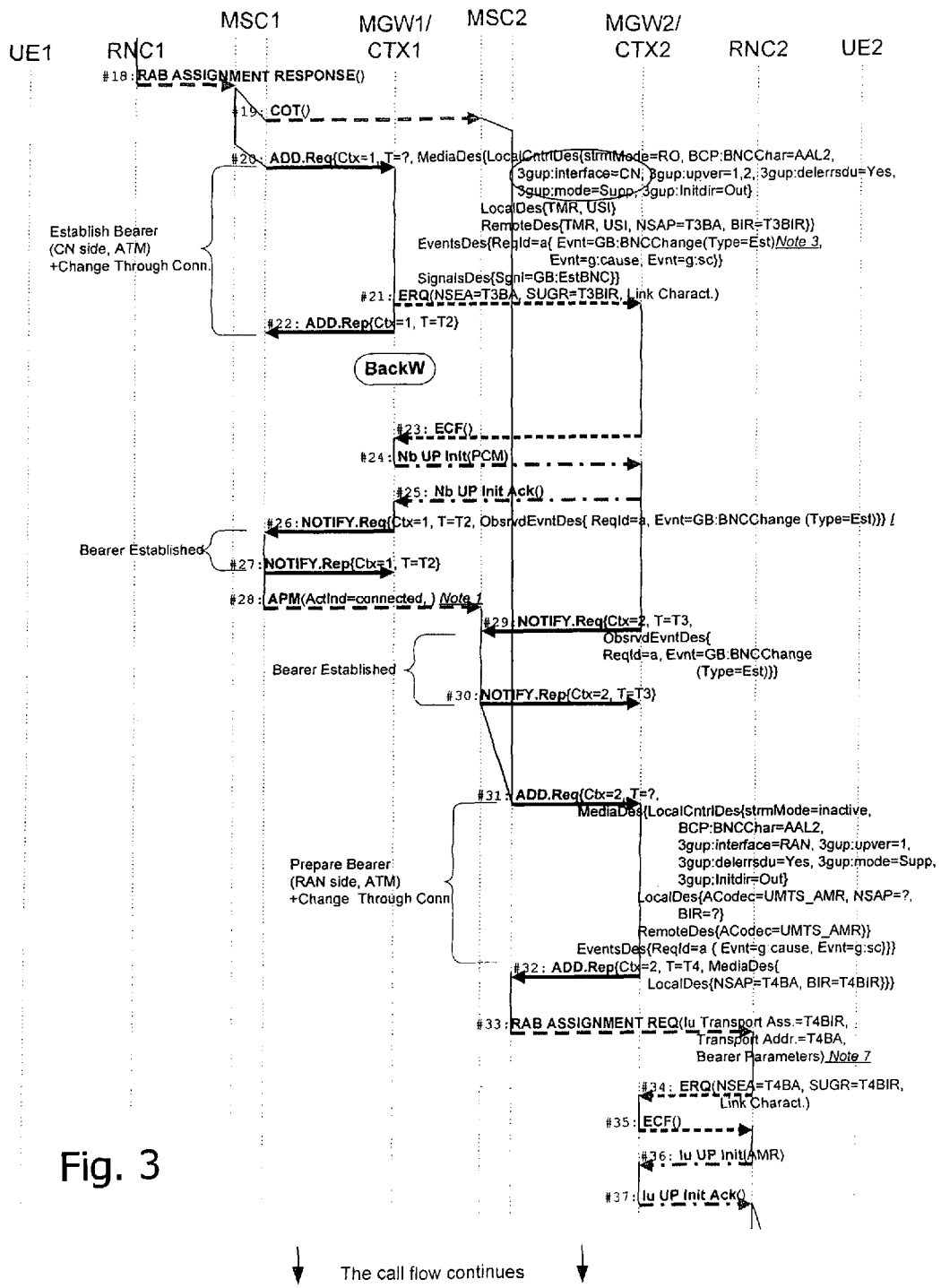
Figure 4:
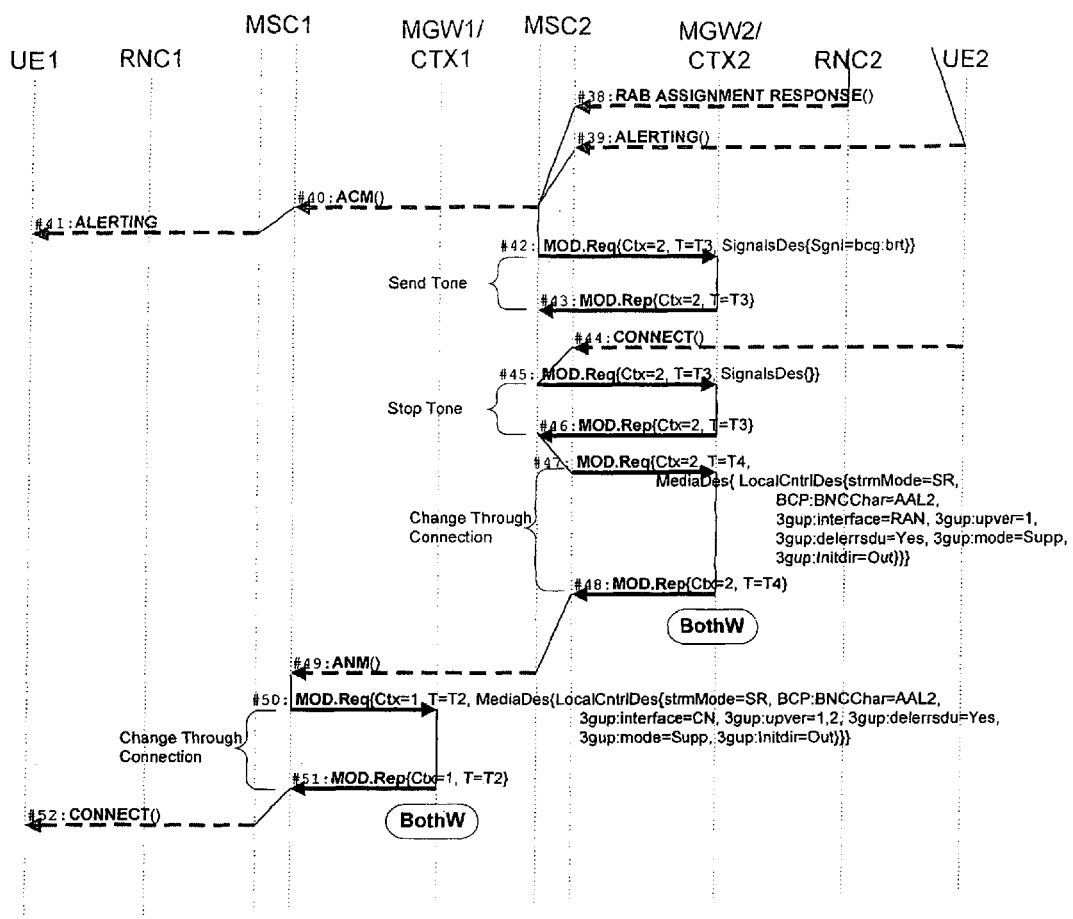

In the messaging scenario shown in FIGS. 2 to 4, message #1 from UE1 to MSC1 will again start the call set up procedure, and will be confirmed by message #2. Because of the deferred MGW selection, IAM message #3 is then sent from MSC1 to MSC2. As mentioned above, the placeholder AAL2/framing in message #3 does not distinguish between Nb and I.trunk framing.

As regards control messages #8 and #20, 3gup (=Nb) framing need no longer be ordered from the control plane, as the framing format selection is now administered on the user plane by the MGWs. Accordingly, the corresponding control information may be omitted in these messages. Even if (e.g., for compatibility or other reasons) messages #8 and #20 are not changed in relation to the framing information included therein, the receiving MGWs will simply ignore this information. Rather, the MGWs select the framing format on their own based on a negotiation process as illustrated in FIG. 7.

Figures 7, 8:
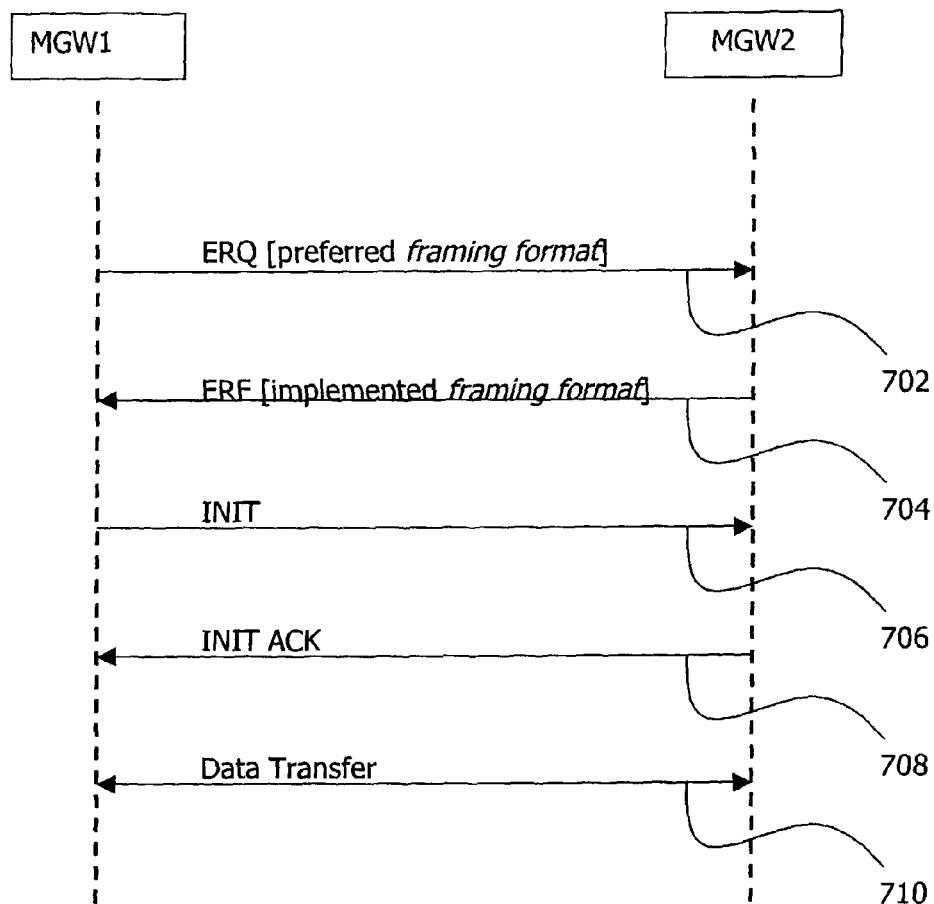
FIG. 7 shows a framing format negotiation process according to the present invention that may be implemented in the messaging scenario of FIGS. 2 to 4.
FIG. 8 schematically shows a look-up table that may form the basis for an alternative framing format selection approach.

FIG. 7 shows a flow chart 700 illustrating framing format negotiation between MGW1 and MGW2 in the course of a signalling scenario that is based on the scenario of FIGS. 2 to 4. The messages shown in FIG. 7 are all sent on the user plane.

In a first step 702, MGW 1 signals to MGW2 by means of an ERQ message #21 the preferred framing format (e.g., Nb framing). In a next step 704, MGW2 replies with an establishment confirmation (ECF) message #23 confirming that the preferred framing format (Nb framing) has been implemented by MGW2. MGW 1 then sends an INIT message, in step 706, to MGW2. With this INIT message, MGW2 is ordered to send a notification when the bearer is established to get deferred MGW selection working. The notification is required as the IAM message #3 does not indicate that the bearer is established for deferred MGW selection. In step 708, MGW2 sends the requested notification. Depending on the negotiated framing format, the user plane is initialised with message #24, so that data transfer on the user plane can commence (step 710).

According to a second exemplary and UP-based framing format selection mechanism for an ATM-based CN, the framing format (here either Nb framing or I.trunk framing) is selected dependent on bearer control information. More specifically, framing format selection depends on the signalled bearer control protocol version to be utilized by the MGWs. To this end, a fixed association is established between framing formats and bearer control protocol versions. The fixed association between bearer control protocol version and implemented framing facilitates the framing synchronization between MGWs.

FIG. 8 shows a look-up table defining for an ATM-based CN pre-defined relationships between the framing formats Nb framing and I.trunk framing on the one hand and the bearer control protocol versions Q.AAL2 CS1 and Q.AAL2 CS2 on the other hand. As shown in FIG. 8, an MGW selects I.trunk framing if CS1 is used, and Nb framing if CS2 is used. In an IP-based CN, a similar selection mechanism may be implemented that depends on the IPBCP used.

In the messaging scenario shown in FIGS. 2 to 4, message #1 from UE1 to MSC1 starts the call set up procedure and is confirmed by message #2. Because of the deferred MGW selection, IAM message #3 is then sent from MSC1 to MSC2. As mentioned above, the placeholder AAL2/framing in message #3 does not distinguish between Nb and I.trunk framing.

As regards control messages #8 and #20, 3gup (=Nb) framing need no longer be ordered from the control plane, as the framing format selection is now administered on the user plane by the MGWs. Accordingly, the corresponding control information may be omitted in these messages. Even if (e.g., for compatibility or other reasons) messages #8 and #20 are not changed in relation to the framing information included therein, the receiving MGWs will simply ignore this information. Rather, the MGWs select the framing format on their own based on the utilized Q.AAL2 version.

The utilized Q.AAL2 version can be gathered from the establishment request (ERQ) message #21 that is sent from MGW1 to MGW2. If the Q.AAL2 version specified in this message is CS1, both MGW1 and MGW2 can determine from the table shown in FIG. 8 that I.trunk framing is to be used. On the other hand, Nb framing will be used by both sides if ERQ message #21 contains a reference to CS2. Depending on the chosen framing format, the user plane is initialised with message #24.

The protocol version is specified in a separate data field of the ERQ message #21 and may have been negotiated between MGW1 and MGW2. For example, one of MGW1 and MGW2 may send a proposal with a list of supported protocol versions to the other MGW. The other MGW may then select one of the proposed protocol versions and inform the proposing MGW about this selection. Of course, other approaches for establishing a particular protocol version may be used alternatively.

The framing format selection mechanisms proposed above allow a decoupling of the control plane and the user plane as regards bearer control. The proposed mechanisms render the BICC actually bearer independent (as, for example, Nb framing has no longer to be signalled from the control plane to the MGWs in context with forward bearer establishment/deferred MGW selection).

The decoupling of control plane and user plane is particularly useful when sophisticated call control features such as forward bearer establishment/deferred MGW selection are to be implemented in inhomogeneous networks. On reason for this usefulness is the fact that forward bearer establishment, deferred MGW selection and other novel features involving control plane signalling between two or more control plane components (such as MSC servers) can be introduced without the need to update the MGWs (in addition to the control plane components). In other words, novel call control features can be realized by installing new/updating the control plane components only and operating the existing MGWs further.

While the invention has been described with respect to particular embodiments (including certain network arrangements and certain orders of steps within various methods), those skilled in the art will recognize that the present invention is not limited to the specific embodiments described and illustrated herein. Therefore, while the invention has been described in relation to its preferred embodiments, it is to be understood that this disclosure is only illustrative. Accordingly, it is intended that the invention be limited only by the scope of the claims appended hereto.

The invention claimed is:

1. A method, in a telecommunications network comprising a layered architecture, of selecting on a user plane a framing format for user plane communications between two user plane components that are separate from a control plane, the user plane components each bridging transmission regimes, comprising:

providing a first user plane component bridging a first transmission regime in a core network and a second transmission regime in a neighboring network and operable in accordance with two or more different framing formats, the first user plane component being controllable via control messages, received from the control plane, free from any framing format instructions;

negotiating on the user plane between the first user plane component and a second user plane component a framing format to be implemented, the negotiating including at least one of:

receiving, by the first user plane component from the second user plane component, a message specifying at least one preferred or supported framing format or a framing format to be selected; and sending, by the first user plane component to the second user plane component, a message specifying at least one preferred or supported framing format or the framing format to be selected;

selecting, by the first user plane component or any other user plane equipment in communication with the first user plane component, a framing format to be used for user plane communications; and implementing the selected framing format by the first user plane component for communications with the second user plane component.

2. The method of claim 1, further comprising:

providing on the control plane a control plane component for generating the control messages that control the first user plane component; and generating, by the control plane component, the control messages free from any framing format instructions.

3. The method of claim 1, further comprising selecting the framing format dependent on control information included in one or more of the control messages and not related to framing format selection.

4. The method of claim 3, further comprising receiving the control information, from the control plane, by both the first user plane component and the second user plane component.

5. The method of claim 1, further comprising selecting the framing format dependent on a bearer control protocol version.

6. The method of claim 5, further comprising:

determining on the user plane the bearer control protocol version to be utilized;

determining on the user plane a framing format that has previously been associated with the bearer control protocol version to be utilized; and selecting the determined framing format for user plane communications.

7. The method of claim 6, further comprising establishing associations between individual framing formats and individual bearer control protocol versions.

8. The method of claim 7, wherein the associations are established in the form of a look-up table.

9. The method of claim 5, further comprising receiving, by the first user plane component from the control plane, control information specifying the bearer control protocol version to be utilized.

10. The method of claim 1, further comprising performing the framing format selection in context with bearer establishment.

11. The method of claim 10, wherein the framing format selection is performed in context with forward bearer establishment or in context with deferred selection of anyone of the first and second user plane component.

12. The method of claim 1, wherein the user plane equipment selecting the framing format is the second user plane component.

13. A first user plane node in a layered telecommunications network for selecting framing format for user plane communications, comprising:

a first interface bridging a first transmission regime in a core network and a second transmission regime in a neighboring network;

a second interface for receiving control messages free from framing format instructions, from a control plane, the control plane being separate from the first and second interfaces;

a controller, triggered by the control messages, for selecting a framing format to be used for user plane communications, the framing format being negotiated on the user plane between the first user plane node and a second user plane node based on at least one of:
- a message received by the first user plane node from the second user plane node specifying at least one preferred or supported framing format or a framing format to be selected; and
- a message sent by the first user plane node to the second user plane node specifying at least one preferred or supported framing format or the framing format to be selected; and a framing unit operable in accordance with two or more different framing formats, the framing unit implementing the selected framing format for communications with the second user plane node via the first interface.

14. The first user plane node of claim 13, configured as a media gateway (MGW).

15. A method, in a telecommunications network comprising a layered architecture, of selecting a user plane framing format for user plane communications between two user plane components that are separate from a control plane, the user plane components each bridging transmission regimes, the method comprising the steps of:

providing a first user plane component bridging a first transmission regime in a core network and a second transmission regime in a neighboring network and operable in accordance with two or more different framing formats, the first user plane component, ignoring any framing format instructions included in the control messages, being triggered via control messages;

negotiating on the user plane between the first user plane component and a second user plane component a framing format to be implemented, the negotiating including at least one of:
- receiving, by the first user plane component from the second user plane component, a message specifying at least one preferred or supported framing format or a framing format to be selected; and
- sending, by the first user plane component to the second user plane component, a message specifying at least one preferred or supported framing format or the framing format to be selected;

the first user plane component selecting a framing format for user plan communication; and implementing the selected framing format by the first user plane component for communications with the second user plane component.

16. The method of claim 15, further comprising, sending a control message free of any framing format instructions, said control message triggering the first user plane component to begin negotiating with the second user plane component to select a framing format preferred by the first and second user plane component, wherein the first and second user plane components are Media Gateways.

* * * * *

UNITED STATES PATENT AND TRADEMARK OFFICE
CERTIFICATE OF CORRECTION

PATENT NO. : 8,738,799 B2  
APPLICATION NO. : 11/815707  
DATED : May 27, 2014  
INVENTOR(S) : Ewert et al.

Page 1 of 1

It is certified that error appears in the above-identified patent and that said Letters Patent is hereby corrected as shown below:

IN THE SPECIFICATION:

In Column 2, Line 22, delete "MGWS," and insert -- MGWs, --, therefor.

IN THE CLAIMS:

In Column 12, Line 17, in Claim 15, delete "user plan" and insert -- user plane --, therefor.

Signed and Sealed this
Eighteenth Day of November, 2014

Michelle K. Lee
*Deputy Director of the United States Patent and Trademark Office*